US008368507B2

(12) United States Patent
Conreux et al.

(10) Patent No.: US 8,368,507 B2
(45) Date of Patent: Feb. 5, 2013

(54) COMMUNICATING ELECTRONIC KEY FOR SECURE ACCESS TO A MECATRONIC CYLINDER

(75) Inventors: Stèphane Conreux, Paris (FR); Arnaud Flecchia, Neuilly-sur-Seine (FR); Roland de la Chapelle, Levallois-Perret (FR)

(73) Assignee: Videx, Inc., Corvallis, OR (US)

( * ) Notice: Subject to any disclaimer, the term of this patent is extended or adjusted under 35 U.S.C. 154(b) by 993 days.

(21) Appl. No.: 11/722,177

(22) PCT Filed: Nov. 18, 2005

(86) PCT No.: PCT/FR2005/002877
§ 371 (c)(1),
(2), (4) Date: Sep. 18, 2008

(87) PCT Pub. No.: WO2006/067286
PCT Pub. Date: Jun. 29, 2006

(65) Prior Publication Data
US 2010/0073133 A1  Mar. 25, 2010

(30) Foreign Application Priority Data
Dec. 20, 2004  (FR) ...................................... 04 53095

(51) Int. Cl.
*G05B 19/00* (2006.01)
(52) U.S. Cl. ........................ 340/5.2; 340/5.64
(58) Field of Classification Search .................. 340/468, 340/5.64, 5.2; 342/357.1; 375/357.1; 70/378.3, 70/278.7, 63; 307/9.1
See application file for complete search history.

(56) References Cited

U.S. PATENT DOCUMENTS

| 4,594,637 | A | | 6/1986 | Falk |
| 4,609,780 | A | | 9/1986 | Clark |
| 4,727,368 | A | | 2/1988 | Larson et al. |
| 4,766,746 | A | * | 8/1988 | Henderson et al. .......... 340/5.73 |
| 4,851,652 | A | | 7/1989 | Imran |
| 4,887,292 | A | | 12/1989 | Barrett et al. |
| 4,914,732 | A | | 4/1990 | Henderson et al. |
| 4,916,443 | A | | 4/1990 | Barrett et al. |
| 4,947,163 | A | | 8/1990 | Henderson et al. |
| 4,988,987 | A | | 1/1991 | Barrett et al. |
| 5,046,084 | A | | 9/1991 | Barrett et al. |
| 5,475,375 | A | | 12/1995 | Barrett et al. |

(Continued)

FOREIGN PATENT DOCUMENTS
DE 19848192 4/2000

OTHER PUBLICATIONS

Landrum, Wade, "Videx Scores Again," Jun. 1, 2000, Locksmith Ledger International, Cygnus Business Media, Fort Atkinson, WI, US—ISSN 1050-2254, vol. 60, Nr:7, pp. 8-10, 12.

*Primary Examiner* — Hai Phan
*Assistant Examiner* — Kaleria Knox
(74) *Attorney, Agent, or Firm* — J. Douglas Wells

(57) ABSTRACT

The invention relates to electronic keys. The invention relates more particularly to an electronic key for secure access to an electronic cylinder. The invention relates to an electronic key (1) enabling control of access to a mecatronic cylinder, wherein said key comprises at least one memory (3) for storing access information, and a microprocessor. The invention is characterized in that said key comprises at least one means of wireless communication with a server (7), comprising an access profile data base, wherein said access information can be remotely modified according to the access profile associated with said key.

4 Claims, 1 Drawing Sheet

U.S. PATENT DOCUMENTS

| | | |
|---|---|---|
| 5,602,536 A | 2/1997 | Henderson et al. |
| 5,648,763 A | 7/1997 | Long |
| 5,705,991 A | 1/1998 | Kniffen et al. |
| 5,794,465 A | 8/1998 | Hill |
| 5,815,557 A | 9/1998 | Larson |
| 5,838,251 A | 11/1998 | Brinkmeyer et al. |
| 6,009,116 A * | 12/1999 | Bednarek et al. ............. 375/130 |
| 6,072,402 A | 6/2000 | Kniffen et al. |
| 6,384,709 B2 | 5/2002 | Mellen et al. |
| 6,418,766 B1 | 7/2002 | Luebeck |
| 6,523,377 B1 * | 2/2003 | Vonlanthen ................. 70/278.3 |
| 6,538,557 B1 | 3/2003 | Giessl |
| 6,718,806 B2 | 4/2004 | Davis |
| 6,745,941 B1 | 6/2004 | Vega |
| 6,774,762 B2 * | 8/2004 | Bates ........................... 340/5.21 |
| 6,803,674 B2 | 10/2004 | Crisp |
| 6,822,553 B1 | 11/2004 | Henderson et al. |
| 6,832,721 B2 | 12/2004 | Fujii |
| 6,842,105 B1 | 1/2005 | Henderson et al. |
| 6,937,140 B1 | 8/2005 | Outslay et al. |
| 7,012,503 B2 | 3/2006 | Nielsen |
| 7,196,610 B2 | 3/2007 | Straumann et al. |
| 7,315,823 B2 | 1/2008 | Brondrup |
| 7,343,165 B2 | 3/2008 | Obradovich |
| 7,373,352 B2 | 5/2008 | Roatis et al. |
| 2001/0015691 A1 | 8/2001 | Mellen et al. |
| 2003/0102957 A1 | 6/2003 | Crisp |
| 2003/0197591 A1 | 10/2003 | Bates |
| 2004/0108938 A1 | 6/2004 | Entrekin |
| 2004/0222699 A1 * | 11/2004 | Bottomley ..................... 307/9.1 |
| 2005/0285716 A1 | 12/2005 | Denison et al. |
| 2006/0170588 A1 * | 8/2006 | Chang ........................ 342/357.1 |
| 2008/0062120 A1 | 3/2008 | Wheeler et al. |

\* cited by examiner

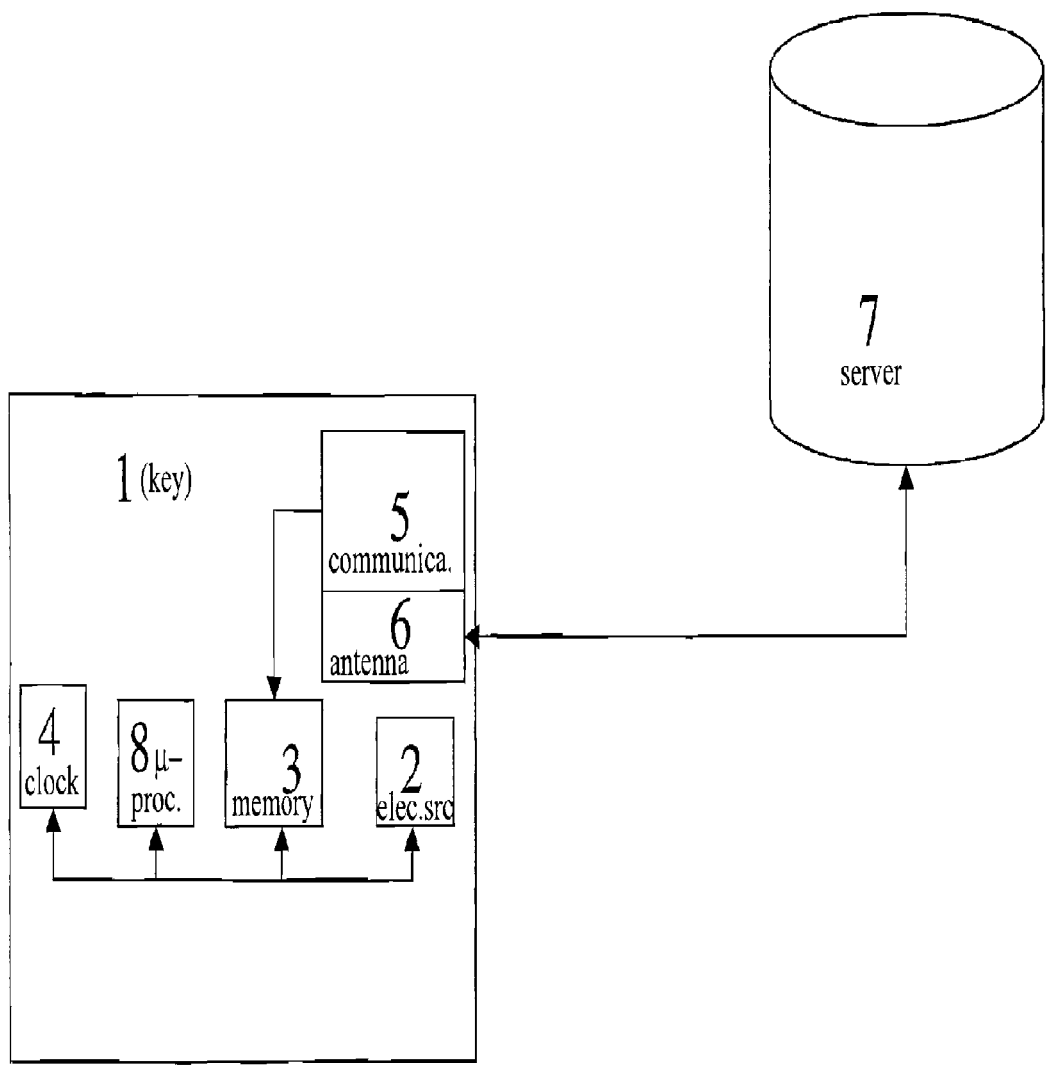

COMMUNICATING ELECTRONIC KEY FOR SECURE ACCESS TO A MECATRONIC CYLINDER

This invention relates to the field of electronic keys.

This invention relates more particularly to an electronic key for secure access to an electronic cylinder or, more specifically, a mecatronic cylinder—meaning a cylinder with mechanical components controlled by electronic devices.

The prior art is already familiar with several electronic key systems.

In particular, US Patent application 2002/0095964 proposes an electronic access key for an electronic cylinder. The key and cylinder include a microprocessor, which stores an identification code. When the key makes contact with the cylinder, the key supplies energy to the cylinder's microprocessor through its battery. When this has stabilized, it engages with the key in a code identification process. If the key's code matches one of the codes authorized by the electronic cylinder, an authorization signal is sent to the key's microprocessor, which responds by supplying energy to a coil, causing the cylinder to open.

In this case, the cylinder and the key are programmed using a programming device. Using this device, one can change the authorization access codes for the key and for the cylinder.

One can fully understand that the problem with such solutions proposed by the prior art is that the access profile for a given key is fixed once the programming is complete. Therefore, a user who wishes to visit several different buildings must either plan ahead when programming the access codes for different cylinders or re-program his key when he gets to each new cylinder. The need for a physical programmer also poses a problem related to interoperability between the programmer and the electronic key.

This disadvantage poses a real challenge for traveling users.

The prior art is already familiar with electronic key solutions for an electronic lock that moves through space. This is the case given in U.S. Pat. No. 6,384,709, for example. This patent pertains to means of transportation (such as a truck) to which one wishes to prevent access until such time as it arrives at a specific destination. To do so, the patent discloses the installation of a GPS [Global Positioning System] antenna on the truck, as well as a GPS locator module. The key is programmed to operate at a precise location. Geographic information is recorded in the key's memory. When the truck has arrived at its destination (the destination programmed into the key), the identification codes and the geographic parameters for the key and for the lock match. It is then possible to open [the lock] during a predetermined period of time.

This document solves the problem of a mobile lock, since opening is conditional upon the lock's position.

However, this does not solve the problem of a traveling user, since the global positioning parameters for the key are fixed, which prevents the lock from being opened when necessary, but not programmed by the controlling forces—notably when outside the geographic zone for opening.

This invention intends to remedy this disadvantage of the prior art by providing an electronic key that allows real-time management of access profiles for users of such keys.

To do so, this invention is of the type described above and is remarkable, in its broadest acceptance, in that it concerns an electronic key that enables control over access to a mecatronic cylinder [lock], wherein said electronic key has at least one memory to store information and one microprocessor characterized by having an antenna, and at least one means of wireless communication with a server containing a database of access profiles, and wherein said access information can be modified remotely in accordance with the access profile associated with said key.

Preferably, said means of wireless communication includes a communications module.

It would be advantageous for said means of wireless communication to include a global positioning module.

In another variant, said means of wireless communication includes both a communications module and a global positioning module.

In one method of implementation, said communications module is a GSM, GPRS, or UMTS-type data communications module and said global positioning module is a satellite-based, GPS-type, global positioning module.

Lastly, as an advantage, said global positioning module is an Earth-based, GSM-type, global positioning module.

The invention also pertains to an access control system that includes an electronic key and a server containing a database of access profiles, wherein said electronic key contains at least one wireless communications module to communicate with said server and wherein said server contains a means to manage the access profiles associated with said key.

Lastly, the invention includes a process for communications within the system based on the invention, characterized in that it includes at least one step for sending an access profile from said server to said electronic key.

According to one method of implementation, it also includes a previous step in which the electronic key sends at least one element of information about its global positioning and in which said access profile includes at least one access authorization associated with said global positioning information.

Additionally, said access profile also includes a time parameter associated with said authorization, of which there is at least one [sic].

Based on a second method of implementation, said access profile includes at least one element of information about global positioning, at least one timing information, and at least one access authorization associated with said global positioning information and said timing information, and in that said electronic key carries out a step to compare said global positioning information against its current global positioning and to compare said timing information against the current time in order to validate said authorization.

One will understand the invention better with the help of the description (provided hereinafter purely for explanatory reasons) of a method of implementation for the invention with reference to the attached FIG. 1, which shows a schematic of the communicating key according to the invention.

As illustrated in FIG. 1, the communicating key according to the invention includes several electronic functions to activate an electronic cylinder. These functions are known to professionals in the field in question, and it pertains to a non-volatile EEPROM memory (3), a microprocessor (8), an electrical source (2), an LED to indicate the opening of the cylinder, a means of producing sound to indicate the battery level and/or validity of the key, and a clock (4).

Based on methods of implementation for the invention, this key may either be a contact key or a contactless key.

In the case of a contact key, it includes an electrical source (2) that will activate the electronic cylinder in order to permit the door to be opened once access to the cylinder is authorized.

In the case of a contactless key, an infrared, RFID, or Bluetooth module or any other local wireless device (not depicted) will enable identification of the key in order to ensure access authorization if the key's ID matches an authorized ID.

It should be understood that the electronic methods for opening the cylinder using the electronic key should not be limiting factors for this invention, since a professional in the field is likely to use any sort of communication between the cylinder and the key without, however, exceeding the scope of this invention. In particular, if the key is a contactless key, the cylinder compatible with that key should include electricity in the form of a battery.

In a completely original fashion, the communicating key also includes a means of wireless communication (5).

For the purposes of this invention, it shall be understood that "means of wireless communication (5)" refers to any remote data communication module, such as a GSM, GPRS or UMTS module or any remote global positioning module of either a satellite-based GPS type or an Earth-based GSM type, or any combination of these two data communication and global positioning modules.

The communicating key according to the invention also includes a transmitter/receiver antenna (6) associated with means of communication (5) in order to communicate with remote servers.

This antenna is connected to the communication and/or global positioning module in order to exchange external data with the key's memory. Preferably and in order to minimize the size of the resulting key, a flat antenna circling the communication and/or global positioning module is selected. However, a professional will understand that the options for global positioning are occasionally difficult depending on the key's surroundings. In particular, the key's global positioning module may not work inside a car. In order to resolve this problem, one might, for example, provide a means of external connection on the key so that it could be connected to an external antenna, such as the car's own antenna, as we see with current GPS systems.

Equipped with these various communication and/or global positioning modules, the electronic key according to the invention can communicate with a server containing a database of access [codes] for the key.

According to a first method of implementation, the communicating key periodically transmits its location to the server. In return, based on the key's global positioning, it receives from the access management server an access profile consisting of a set of cylinders accessible for a predetermined length of time. In this method of implementation, the access profile contains an authorization attribute (for example, IDs for accessible cylinders) and a time attribute (for example, access is authorized for three hours). This access profile will then be periodically updated once the key changes location. If its new location changes the access profile, the current access rights replace the previous rights in the memory in an irreversible manner. Essentially, by receiving coordinates from a key (defined by its ID), a server compares the coordinates with the authorization zones and, if necessary, updates the key's authorizations by remotely transmitting the access authorization.

This updated data is received by the key's communications module and written on the rewritable memory in an irreversible manner.

According to a second method of implementation, the access management server transmits an access profile to the key that comprises a time attribute, a set of authorizations, as well as a geographic attribute. The communicating key records that it has this or that authorization for a given time period and in a given geographic zone. Thus, if [the key] changes geographic zone, the global positioning module in the key will detect the new position, will compare this with the authorization zone, and, if the two do not match, will deactivate the authorizations. Note: The deactivation of authorizations takes place either at the moment when the comparison does not show a similarity between the access profile and the current global positioning and time parameters or at the moment there is an attempt to open the lock, since the key does not then transmit codes matching those for the cylinder if the current parameters do not correspond to the access profile.

It must be noted that in both methods of implementation, if the key no longer receives information coming from the server for a predetermined period, the key deactivates its access profile and the connected authorizations.

It is thereby self-supervising the communications with the remote server.

At the database level, access rights associated with the key can be defined geographically. Thus, [the database] stores authorized access [codes] for a given key ID and geographic zone.

After recording the access authorization in the key's memory, the key can then open the mecatronic cylinder using mechanisms known to a professional.

Remote management of the key's access rights enables an enhanced level of security as compared to known systems. Essentially, in the event keys are lost or stolen, it is possible to disrupt—by making an urgent call or by sending a remotely transmissible code—access rights for the lost or stolen key. Then that key could no longer be used. At any time, it is also possible—by updating the access rights—to disrupt all of the key's authorizations.

However, in the event the means of communication includes a GSM or GPS-type positioning system, the lost or stolen key can easily be recovered.

In addition, the log of operations performed by the key can be viewed thanks to the means of remote communication embedded in the key. In effect, any and all openings of cylinders, any and all changes of position, and any and all changes to permissions can be recorded on the server (7). In this way, all events associated with the key can be "tracked" by the server in order to create a user log or as a means of proof used in legal disputes.

The foregoing description of the invention is provided as an example. It is understood that a professional is in a position to create different variations of the invention without exceeding the scope of the patent.

The invention claimed is:

1. A method of using a communicating electronic key for secure access to one or more mechatronic locks, comprising said key moving from one geographical location to another, and said key:
    (a) periodically wirelessly transmitting its geographical location to a remotely located access management server so as to allow said server to identify location coordinates for said key, said key defined by its ID;
    (b) receiving, and saving in said key's internal memory, an access profile from said server, said access profile based at least in part on said key's geographical location, and said access profile comprising a set of one or more mechatronic locks accessible to said key for a predetermined length of time;
    (c) causing said server to periodically update access profile information associated with said key once said key changes its geographical location; and
    (d) if said key's new location causes a change in said access profile information, replacing in said key's internal memory said key's previous access profile with said key's new access profile in an irreversible manner.

2. The method of claim 1 further comprising using said key's internal clock function to determine times within which said set of locks are accessible to said key, said times based at least in part on said access profile stored in said key's internal memory.

3. The method of claim 1 further comprising using said key's internal global positioning function to determine said key's geographical location.

4. The method of claim 1 further comprising said key self-supervising its communications with said server by said key deactivating its access profile if said key no longer receives information from said server for a predetermined period of time, thereby preventing said key from accessing said set of one or more locks if said key is no longer sufficiently communicating with said server.

* * * * *